United States Patent [19]

Jinnai

[11] Patent Number: 5,471,315
[45] Date of Patent: Nov. 28, 1995

[54] RECORDING APPARATUS WITH MULTIPLE RECORDING MODES AND REDUCED WASTE OF RECORDING CAPACITY

[75] Inventor: Shigeru Jinnai, Kawasaki, Japan

[73] Assignee: Canon Kabushiki Kaisha, Tokyo, Japan

[21] Appl. No.: 281,941

[22] Filed: Jan. 6, 1992

Related U.S. Application Data

[63] Continuation of Ser. No. 369,638, Jun. 21, 1989, abandoned.

[30] Foreign Application Priority Data

Jun. 29, 1988 [JP] Japan ................................. 63-163112

[51] Int. Cl.⁶ .................................................. H04N 5/76
[52] U.S. Cl. .......................... 358/337; 358/341; 358/342; 360/11.1; 360/35.1
[58] Field of Search ............................... 360/35.1, 73.01, 360/73.03, 73.05, 73.06, 73.07, 73.08, 73.09, 73.11, 73.12, 19.1, 10.1, 10.2, 10.3, 13, 33.1, 97.01, 97.04, 9.1; 358/335, 341, 342, 321, 906, 909, 338, 346, 337; 369/83, 189, 239

[56] References Cited

U.S. PATENT DOCUMENTS

| | | | |
|---|---|---|---|
| 4,546,391 | 10/1985 | Kimura | 360/35.1 |
| 4,570,188 | 2/1986 | Ichiyawagi | 360/35.1 |
| 4,647,987 | 3/1987 | Nutting | 30/35.1 |
| 4,691,252 | 9/1987 | Okada et al. | 360/35.1 |
| 4,725,897 | 2/1988 | Konishi | 360/35.1 |

*Primary Examiner*—W. R. Young
*Attorney, Agent, or Firm*—Fitzpatrick, Cella, Harper & Scinto

[57] ABSTRACT

In a recording apparatus for information recording in succession in plural memory blocks with a predetermined recording speed, a switch is used for selecting either a first recording mode for information recording in the plural memory blocks so as to form unrecorded ones and recorded ones in mixed manner, or a second recording mode so as not to form such mixed ones, and a control unit controls the recording speed according to the switching state of the switch.

8 Claims, 4 Drawing Sheets

FIG.3

| MAX VALUE OF NON-RECORDING TRACK SPACING | LOW SPEED SUCCESSIVE RECORDING | | HIGH SPEED SUCCESSIVE RECORDING | |
|---|---|---|---|---|
| | FIELD | FRAME | FIELD | FRAME |
| 1 | 5 FIELD/SEC | 4.5 | 10 | 9 |
| 2 | 4.5 | 4 | 9 | 8 |
| 3 ~ 5 | 4 | 3 | 8 | 6 |
| 6 ~ 10 | 3 | 2.5 | 6 | 5 |
| 11 | 2 | 1.5 | 4 | 3 |

FIG.4

| THE NUMBER OF SKIP TRACK | LOW SPEED SUCCESSIVE RECORDING | | HIGH SPEED SUCCESSIVE RECORDING | |
|---|---|---|---|---|
| | FIELD | FRAME | FIELD | FRAME |
| 1 | 4.5 | 4 | 9 | 8 |
| 2 | 4 | 3.5 | 8 | 7 |
| 3 | 3.5 | 3 | 7 | 6 |

FIG.5

| LOW SPEED SUCCESSIVE RECORDING | | HIGH SPEED SUCCESSIVE RECORDING | |
|---|---|---|---|
| FIELD | FRAME | FIELD | FRAME |
| 5 | 4.5 | 10 | 9 |

RECORDING APPARATUS WITH MULTIPLE RECORDING MODES AND REDUCED WASTE OF RECORDING CAPACITY

This application is a continuation, of application Ser. No. 07/369,638 filed Jun. 21, 1989.

BACKGROUND OF THE INVENTION

1. Field of the Invention

The present invention relates to a recording apparatus, and more particularly to an apparatus suitable for recording image signals.

2. Related Background Art

As an example of the above-mentioned apparatus there is considered an apparatus for recording image signals on a magnetic disk by forming concentric tracks thereon.

In such apparatus the recording is conducted on said concentric tracks in succession, for example from outside to inside, in such manner as not to leave unrecorded track on the way.

However, in such method, if information to be paired with the already recorded information is to be recorded afterwards, there results an inconvenience that the recording position of such information to be paired is distant from that of the already recorded information.

It is therefore possible, in successive recording from the outside toward the inside of the disk, to provide a recording mode in which some tracks, which can be called after-recording tracks, are left for recording afterwards of the information to be paired.

However, in such recording mode, the amount of movement of the recording head has to be larger in order to provide said after-recording track, and such mode is not realizable beyond a certain recording speed (other factors equal).

Such drawback is not limited to the above-explained recording on a disk, but also exists in case of recording on a medium of other forms, for example a tape-shaped recording medium.

SUMMARY OF THE INVENTION

In consideration of the foregoing, an object of the present invention is to provide a recording apparatus capable of stable recording at the selected recording speed in any case.

Another object of the present invention is to provide a recording apparatus capable of stable recording also in a so-called skip recording mode, in which the recording operation is conducted with formation of after-recording areas.

Still another object of the present invention is to provide a recording apparatus capable of stable recording also in an insert recording mode in which the recording operation is conducted by searching unrecorded areas on the medium.

The foregoing objects can be achieved, according to a preferred embodiment of the present invention, by a recording apparatus for recording in succession in plural memory blocks with a predetermined recording speed, provided with switch means for selecting a first recording mode in which the recording operation is so conducted as to form recorded blocks, and unrecorded blocks in mixed manner, from among said memory blocks, or a second recording mode in which the recording operation is so conducted as not to form such mixed areas, and means for controlling said recording speed in response to functioning of said switch means.

Still other objects of the present invention, and the advantages thereof, will become fully apparent from the following description of the preferred embodiments, to be taken in conjunction with the attached drawings.

BRIEF DESCRIPTION OF THE DRAWINGS

FIG. 3 is a chart illustrating the successive recording speed in an insert recording mode;

FIG. 4 is a chart illustrating the successive recording speed in a skip recording mode;

FIG. 5 is a chart illustrating the successive recording speed in a normal recording mode.

DESCRIPTION OF THE PREFERRED EMBODIMENT

An embodiment of the present invention to be explained in the following comprises a still video recording apparatus for defining concentric tracks on a magnetic disk called a video floppy disk and recording the image of a frame on each track. However the present invention is not limited to such apparatus but is applicable also to a recording apparatus for recording on an optical disk, a tape-shaped recording medium or a solid-state memory. Naturally it is applicable also to apparatus for recording information other than image signals.

In the following there will be explained an embodiment of the present invention, with reference to the attached drawings.

Figure 2:
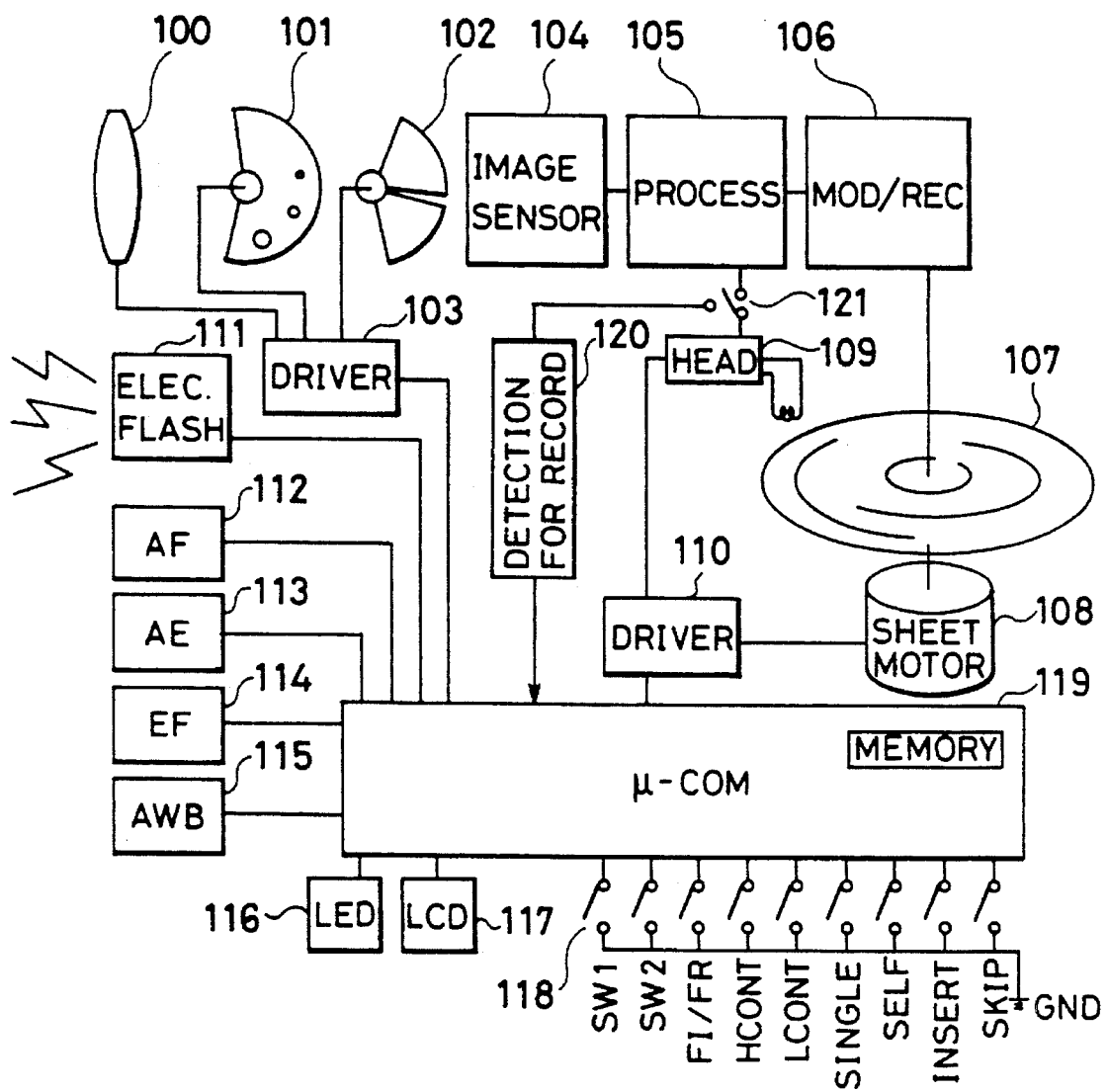
FIG. 2 is a block diagram of such embodiment of the apparatus of the present invention.

FIG. 2 is a block diagram of an embodiment of the apparatus of the present invention, wherein are shown a lens 100; a diaphragm 101; a mechanical shutter 102; a driver 103 for controlling said lens, diaphragm and mechanical shutter; an image sensor 104; a process circuit 105 for forming a luminance signal and color difference signals from the output signal of the image sensor 104; a recording circuit 106 for processing such (e.g., modulating), the luminance signal and color difference signals released from the process circuit 105; a video floppy disk 107 constituting a magnetic recording medium; a motor 108 for rotating said video floppy disk 107; a recording head 109 for recording on the video floppy disk 107; a driver 110 for causing relative movement of the motor 108 and the recording head 109; an electric flash unit 111; an automatic focusing circuit 112; an automatic exposure circuit 113; an electric flash control circuit 114 for flash emission control on said electric flash; an automatic white balance (AWB) circuit 115 for measuring the color temperature of the incident light; an LED 116 indicating that the successive recording speed is lowered; a liquid crystal display (LCD) 117 for displaying the photographing mode, track number, date, time, ID etc.; a switch group 118; and a microcomputer 119 for controlling the entire system and monitoring the switch group 118. Said switch group 118 contains a switch SW1 for conducting preparations for image recording or photographing, such as auto focusing, auto exposure, auto-white balancing, activation of motor, etc.; a switch SW2 for executing the photographing or image recording; a switch FI/FR for selecting a field recording mode or a frame recording mode; a switch HCONT for selecting a high-speed successive recording mode; a switch LCONT for selecting a low-speed successive recording mode; a switch SINGLE for selecting a single shot recording mode; a switch SELF for selecting a self-timer mode, wherein only one of the above-mentioned four switches, from HCONT to SELF, is closed; a switch INSER for selecting an insert mode; and a switch SKIP for selecting a skip mode, wherein said switches INSERT and SKIP are both turned off or either one is turned on.

Figure 6:
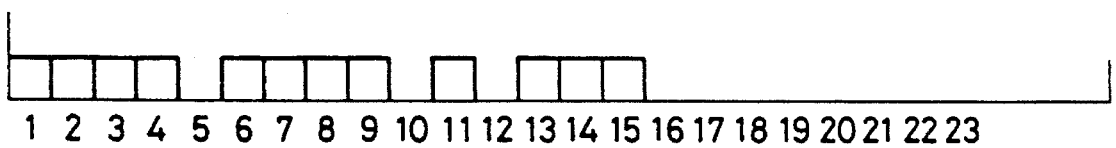
FIG. 6, consisting of FIGS. 6(1) through 6(4) is a view showing the sequence of recording in the insert, skip and normal recording modes.
Figure 6:
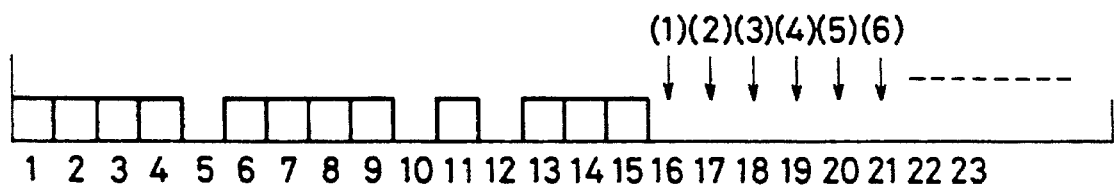
Figure 6:
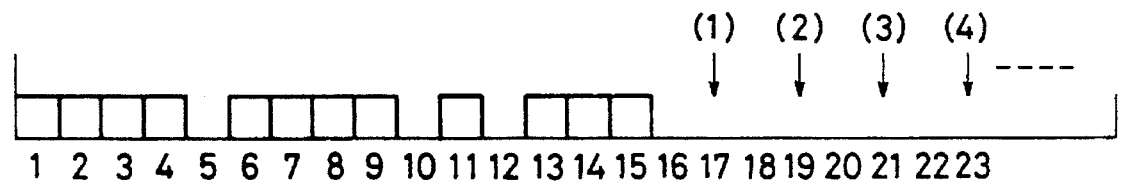
Figure 6:
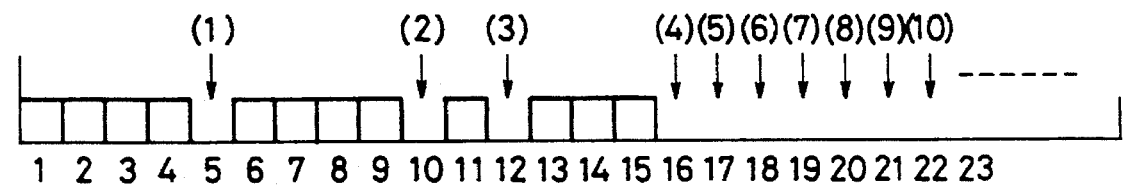

Now reference is made to FIG. 6 for explaining the skip, insert and normal modes mentioned above.

FIG. 6(1) shows the state of recording on, e.g., 50 concentric tracks formed on the video floppy disk 107 composed of a magnetic sheet, wherein the numerals indicate the numbers of tracks, numbered from the outside of said disk.

In the example shown in FIG. 6(1), the tracks 1–4, 6–9, 11 and 13–15 are already recorded, while the tracks 5, 10, 12, 16 and succeeding tracks are empty, or not yet recorded.

In the above-mentioned normal mode, shown in FIG. 6(2), the recording is successively conducted, among the empty tracks on the magnetic disk, on the outermost track from which all radically-inward tracks are all empty.

More specifically, as shown in FIG. 6(2, the recording is made at first on track 16 (marked as (1)), then on track 17 (marked as (2)), and so forth.

In the skip mode, shown in FIG. 6(b 3), the recording is conducted in a similar order as in the normal mode, but the recording is always preceded by an empty track. In this mode there is secured an area for recording an additional information signal corresponding to an already recorded image signal. In this manner it is rendered possible to secure an area for recording, for example, an audio signal corresponding to an already recorded image signal.

In the insert mode, shown in FIG. 6(4), the recording is conducted in succession on the empty tracks on the magnetic disk, starting from the outermost one.

The insert mode is provided in the present embodiment, in order to fill all the tracks by recording on the magnetic disk recorded in the above-explained skip mode.

In order to effect the above-explained recording modes, the empty tracks and recorded tracks on the magnetic disk 107 have to be discriminated. For this purpose, in the present embodiment, there are provided a recording detection circuit 120, and a switch 121 for connecting the head 109 either to the recording circuit 106 or to said recording detection circuit 120.

In the aforementioned-field recording mode, the image signal of a frame is recorded on a circular track on the magnetic disk 107, while in the frame recording mode, said image signal is recorded on two adjacent concentric tracks on the disk.

Figure 1:
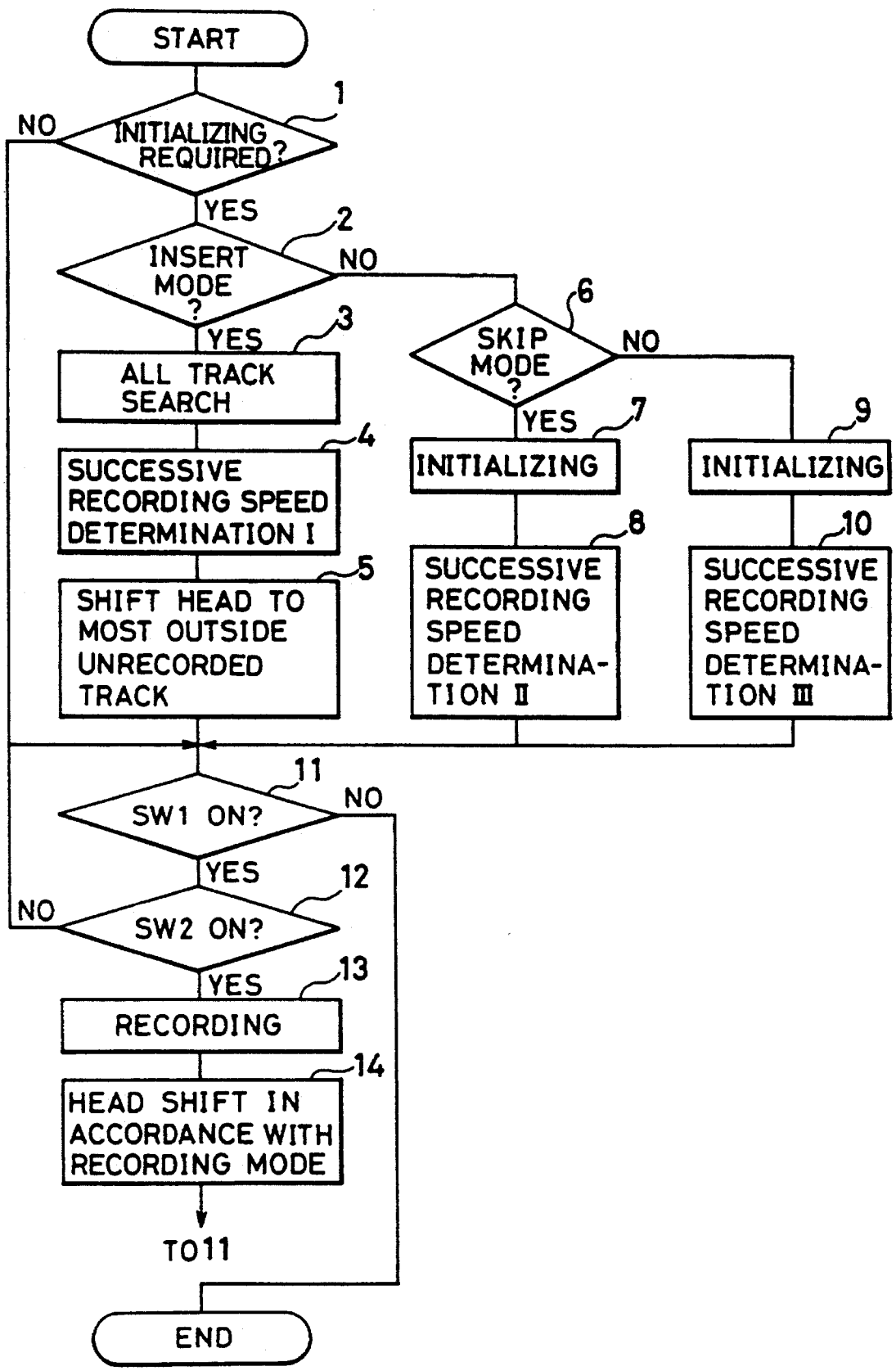
FIG. 1 is a flow chart showing the function of an embodiment of the present invention.

FIG. 1 is a flow chart showing the function of the embodiment of the present invention. FIGS. 3, 4 and 5 respectively show the successive recording speeds in the insert, skip and normal modes.

Now reference is made to FIG. 1 for explaining the control sequence.

The power supply of the apparatus is initiated by the actuation of a selector switch for the above-explained modes or the switch SW1, and the microcomputer is activated. At first step 1 discriminates whether an initialization is necessary, namely whether the head 109 is already positioned on the empty track marked as (1) in FIG. 6 among the empty tracks, and, if not, the sequence proceeds to a step 2 for discriminating whether the insert mode has been selected. If that mode has been selected, the sequence proceeds to step 3 for shifting the switch 121 to the detection circuit 120 for detecting the recording state of all the tracks and determining the maximum spacing between empty tracks. Then step 4 determines the successive recording speed, using the data in the chart shown in FIG. 3 and depending on the maximum spacing between the empty tracks, and the data whether the high or low speed successive recording mode is selected and whether the field or frame recording mode is selected. The values shown in FIG. 3 are recorded as a table in a memory of the microcomputer 119. For example, if the maximum spacing of the empty tracks is "4", in the field recording mode and in the low-speed successive recording mode, there is selected a recording speed of 4 frames/sec. The thus selected value is stored in a non-volatile memory in the microcomputer 119. If the thus selected successive recording speed is lower than the successive recording speed in the normal mode shown in FIG. 5, step 5 turns on the LED 116 to indicate such lower recording speed, and shifts the head to the outermost empty track.. Then the sequence proceeds to step 11.

If step 2 identifies that the insert mode has not been selected, the sequence proceeds to step 6, for discriminating whether the skip mode has been selected, and, if that mode has been selected, the sequence further proceeds to step 7. Step 7 executes initialization, as explained in FIG. 6(3), by shifting the head to a track immediately inside the innermost recorded track. Then a step 8 determines the successive recording speed using the data shown in FIG. 4 and depending on the number of tracks to be skipped, and on the data of high or low speed successive recording mode and on the field or frame recording mode, and the selected recording speed is recorded in the non-volatile memory. Since the successive recording speed in the skip mode is always lower than that in the normal mode, the LED 116 is turned on to indicate such low recording speed, and the sequence proceeds to step 11.

If step 6 identifies that the skip mode has not been selected, the mode is identified as the normal mode, so that the sequence proceeds to step 9 for initialization by shifting the head to a track immediately inside the innermost recorded track. Then a step 10 determines the successive recording speed using the data shown in FIG. 5 and depending on the data on the high or low speed successive recording mode and on the field or frame recording mode, and the thus selected recording speed is recorded in the non-volatile memory. Then the sequence proceeds to step 11. Also, if step 1 identifies that the initialization is unnecessary, the sequence proceeds to step 11. If the switch SW1 is on in the step 11, sequence proceeds to step 12, and, if the switch SW2 is also on, the image recording is executed. As the flow chart shown in FIG. 1 indicates the successive recording modes, step 14 moves the head 109 as shown in FIG. 6, and the sequence returns to the step 11. Thus, in the present embodiment, the successive recording speed is determined according to the data shown in FIGS. 3, 4 and 5, and the recording is executed with the speed stored in the non-volatile memory.

In the insert mode, the successive recording speed becomes very low if the maximum spacing between the empty tracks increases. It is therefore possible also to provide selector means for selecting optimum condition or not if said spacing exceeds a predetermined value.

As explained in the foregoing, the present embodiment is capable of maintaining a constant interval of recordings in the successive recording operation, by optimizing the successive recording speed in the insert mode or in the skip mode, based on the data on the recording state of the video floppy disk, the number of tracks to be skipped, the low or high speed successive recording mode and the field or frame recording mode selected.

In the present embodiment, the aforementioned first recording mode, in which the recording is so conducted as to form empty memory blocks and recorded memory blocks in mixed manner, is called the skip mode, and the second recording mode in which such mixed memory blocks are not formed, is called the insert mode or normal mode, and these first and second modes are selected by a switch shown in FIG. 2.

As explained in the foregoing, the present embodiment assures the recording in respective mode by switching the successive recording speed according to the recording mode.

I claim:

1. An image information recording apparatus that records image information of a plurality of image planes successively for each image plane in order into a recording medium which has a plurality of recording areas, each of the plurality of recording areas having a predetermined information recording capacity, comprising:

a) recording means for recording the image information into the recording medium, said recording means being operative in either one of a first recording mode, in which said recording means records the image information in order into a first plurality of said recording areas at first recording time intervals while not recording image information in a corresponding number of said recording areas, and a second recording mode, in which said recording means records the image information in order into a second plurality of said recording areas at second recording time intervals shorter than the first recording time intervals without keeping any recording areas from being recorded in;

b) recording mode instructing means for providing an instruction to said recording means to operate in one of the first recording mode and the second recording mode; and c) recording operation control means for controlling said recording means to record the image information at the respective recording time interval corresponding to the instruction of said recording mode instruction means.

2. An apparatus according to claim 1, wherein the recording medium is a disk shaped recording medium and wherein a plurality of recording tracks are provided on the disk shaped recording medium as said plurality of recording areas.

3. An apparatus according to claim 2, wherein said recording means includes at least one recording head movable among the plurality of recording tracks on the disk shaped recording medium.

4. An image information recording apparatus that records image information of a plurality of image planes successively for each image plane in order into a recording medium which has a plurality of recording areas, each of the plurality of recording areas having a predetermined information recording capacity, comprising:

a) recording means for recording the image information into the recording medium, said recording means being operative in either one of a first recording mode, in which said recording means records the image information in order into a first plurality of said recording areas at first recording time intervals while not recording image information in a corresponding number of said recording areas so as to hold said corresponding number of said recording areas for later recording audio information, and a second recording mode, in which said recording means records the image information into a second plurality of said recording areas at second recording time intervals shorter than the first recording time intervals without keeping any recording areas from being recorded in;

b) recording mode instructing means for providing an instruction to said recording means to operate in one of the first recording mode and the second recording mode; and c) recording operation control means for controlling said recording means to record the image information at the respective recording time interval corresponding to the instruction of said recording mode instruction means.

5. An apparatus according to claim 4, further comprising display means for displaying the recording time interval information corresponding to the instruction of said recording mode instruction means.

6. An apparatus according to claim 5, wherein said display means includes a liquid crystal display device.

7. An apparatus according to claim 4, wherein the recording medium is a disk shaped recording medium and wherein a plurality of recording tracks are provided on the disk shaped recording medium as said plurality of recording areas.

8. An apparatus according to claim 7, wherein said recording means includes at least one recording head movable among the plurality of recording tracks on the disk shaped recording medium.

* * * * *